//[19] United States Patent
Franklin

[11] 3,714,412
[45] Jan. 30, 1973

[54] BICYCLE LAMP RADIO DEVICE
[76] Inventor: Lester Kenneth Franklin, 23A Repulse Bay Rd., Apt. 10A, Hong Kong
[22] Filed: July 29, 1970
[21] Appl. No.: 59,299

[30] Foreign Application Priority Data

March 10, 1969 Japan..................................44/20715

[52] U.S. Cl. ..............240/7.55, 116/124.1, 116/142, 240/2, 325/312
[51] Int. Cl. ...............................................B62j 5/00
[58] Field of Search .......240/2, 2 L, 7.55, 7.6, 10.66; 248/24, 25; 312/7; 340/394, 388; 325/312, 310, 352, 361; 116/124.1, 124.2, 124.3, 124.4, 137, 142

[56] References Cited

UNITED STATES PATENTS

| | | | |
|---|---|---|---|
| D184,382 | 2/1959 | Smaltz | D48/24 |
| 1,752,196 | 3/1939 | Datrie | 240/2 L UX |
| 2,137,230 | 11/1938 | Arden | 240/10.66 |
| 2,542,613 | 2/1951 | Aufiero | 240/7.55 |
| 2,931,028 | 3/1960 | Propst | 340/394 |

OTHER PUBLICATIONS

Publication Incentive Merchandising Oct. 1968 Page 145 "Premium Solver" Bike Radio/Headlight Primary Examiner—Louis J. Capozi
Attorney—Irons, Sears, Staas, Halsey and Santorelli

[57] ABSTRACT

This invention discloses a bicycle lamp radio device which comprises a body formed in tapered cylindrical shape and incorporating therein a cell box for encasing a dry cell inside, a lamp unit and a radio set, said lamp unit and said radio set being positioned opposite each other; and a partly-cut-out-cylindrical outer case having an inner wall which exactly fits to the periphery of said body thereby to cover water-tightly an opening for replacing the dry cell formed in the upper wall of said body. The possible trouble and corrosion of the electric unit can be completely avoided. In addition, the outer case can be easily attached to and detached from the body, whereby replacement of a dry cell can be easily and rapidly made. The thus constructed bicycle lamp radio device according to the present invention can serve both as a bicycle lamp at night driving and a radio receiver for listening to broadcasting when desired, is simple in structure and can be manufactured at reasonable cost.

3 Claims, 5 Drawing Figures

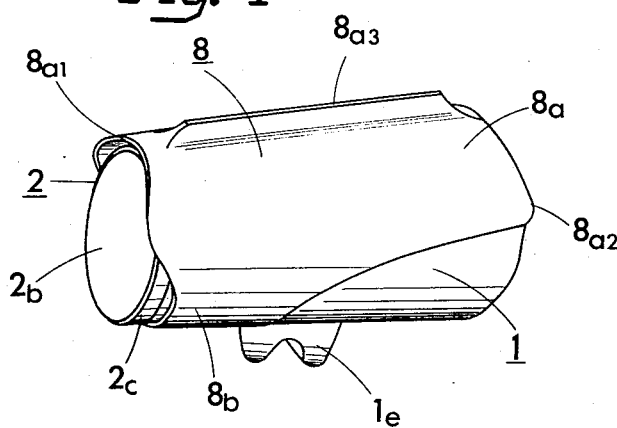
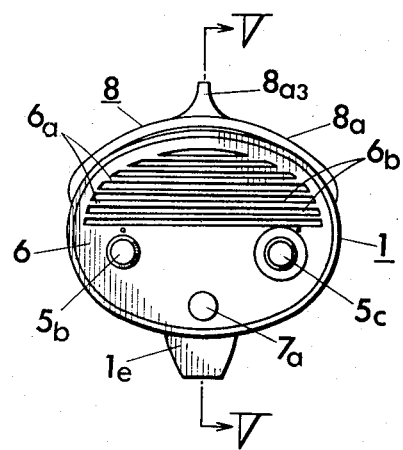
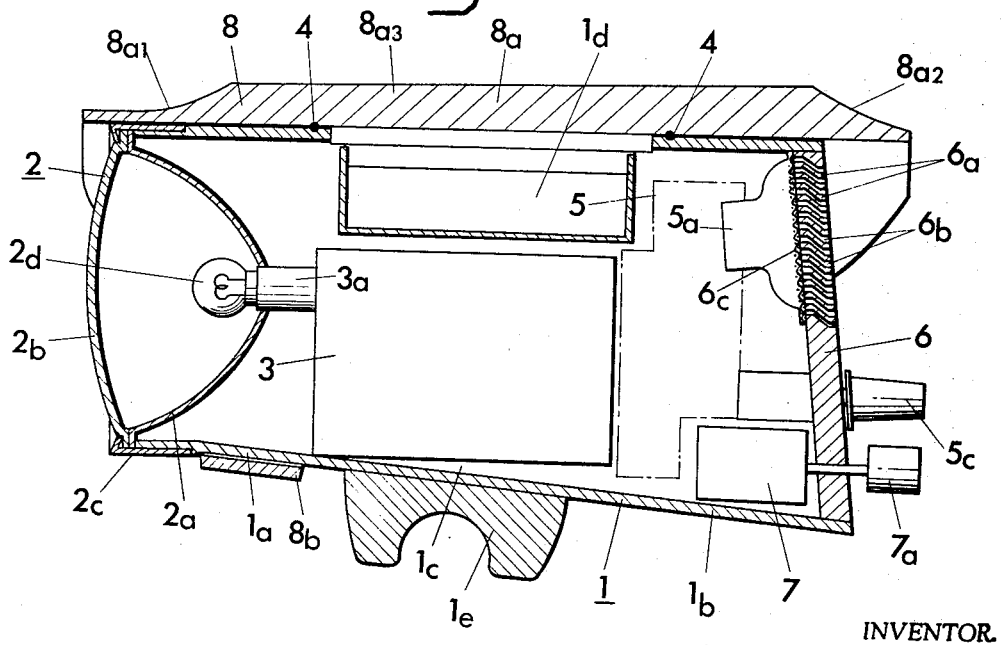

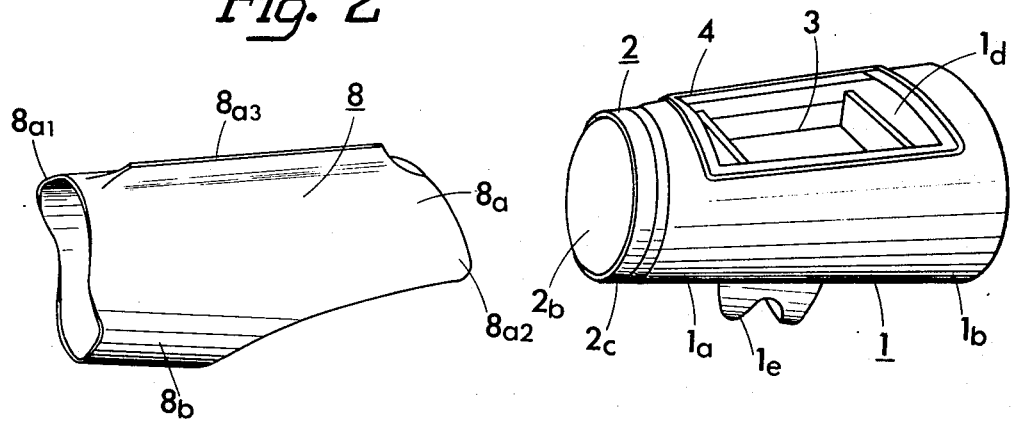
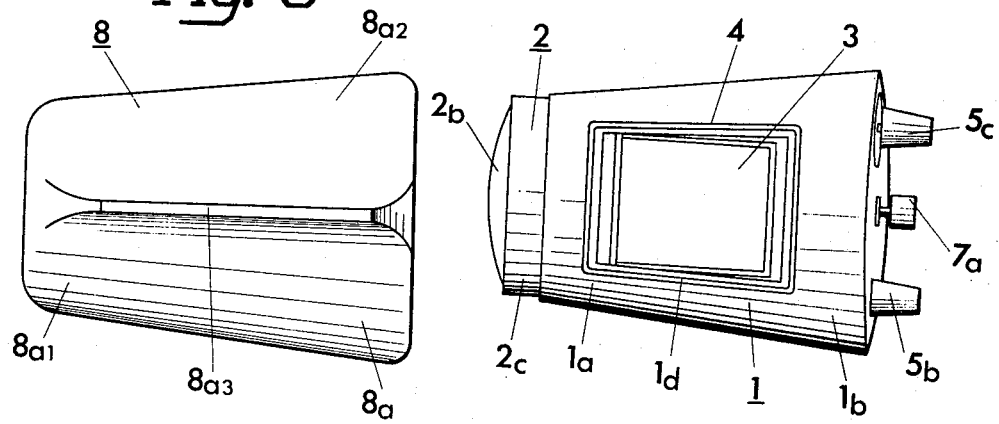

BICYCLE LAMP RADIO DEVICE

This invention relates to a bicycle lamp radio device, and more particularly to a bicycle lamp radio device adapted to be mounted on a bicycle, autobicycle etc.

It is an object of the present invention to provide a bicycle lamp radio device which comprises a body having a lamp unit and a radio set incorporated therein and an outer case which can be easily attached to and detached from said body thereby to enable a dry cell to be replaced rapidly and easily.

It is another object of the present invention to provide a bicycle lamp radio device of the kind described, wherein an opening formed in the body to replace a dry cell is kept water-tightly with said outer case thereby to inhibit electric trouble, corrosion, etc. caused by water-drops such as the rain etc.

It is a further object of the present invention to provide a bicycle lamp radio device of the character described, which is simple in structure, free from causing troubles and can be manufactured and sold at reasonable cost.

Essentially, according to the present invention, there is provided a bicycle lamp radio device which comprises a body formed in tapered cylindrical shape and incorporating therein a cell box for encasing a dry cell inside, a lamp unit and a radio set, said lamp unit and said radio set being positioned opposite each other; and a partly-cut-out-cylindrical outer case having an inner wall which exactly fits to the periphery of said body thereby to cover water-tightly an opening for replacing the dry cell formed in the upper wall of said body.

The foregoing and other objects, features and advantages of this invention will be apparent from the following description taken in connection with the accompanying drawings illustrating a preferred embodiment of this invention, in which:

FIG. 1 is a perspective view of a bicycle lamp radio device according to the present invention;

FIG. 2 is a perspective view of a body of the bicycle lamp radio device as shown in FIG. 1, with the outer case detached and shown separately;

FIG. 3 is a plan view of the same as shown in FIG. 2;

FIG. 4 is a side elevation view of the bicycle lamp radio device shown in FIG. 1; and FIG. 5 is a sectional view taken along the line V—V of FIG. 4.

Referring now to FIGS. 1 to 5, 1 is a body made of plastics, metal or the like and formed in tapered shape which grows bulky toward the backward portion 1b from the forward portion 1a. The body 1 is provided in its forward portion with a reflecting plate 2a and a lens 2b of a lamp unit 2 which are fitted to said body 1 by means of a holding ring 2c.

Inside the body 1, there is left a space 1c to accommodate a dry cell, in which space is incorporated a cell box 3. To the front face of said cell box 3, there is attached a lamp socket 3a into which a lamp 2d is screwed as depicted in FIG. 5. In the upper wall of the body 1, there is formed an opening 1d for replacing a dry cell and a packing member 4 made of rubber or the like is fixedly provided along the circumference of said opening. On the bottom surface of the body is provided a mounting member 1e for mounting the device on a bicycle etc., for example, on its handle, which may be formed either integrally or separately.

5 is a radio set incorporated inside the body 1 having a speaker 5a, a volume knob 5b and a tuning knob 5c provided on a cover plate 6 which is attached to the back portion 1b of the body. In the upper portion of said cover plate 6, there are formed a number of elongated sound openings 6b each defined by inclined steps 6a, as depicted in FIG. 5. To the inner wall of the cover plate 6 on its portion of the sound openings is attached a mesh 6c. The inclined steps serve also as a rain shelter. The rain shelter of the type described can effectively prevent intrusion of the rain, dust, etc.

7 is a switch for an electric source of a lamp unit attached to the cover plate 6. The switch 7 is operated by a switch knob 7a projecting outside.

8 is an outer case having its inner wall adapted to be fitted water-tightly to the packing member 4 of the opening 1d of the body, and being longer than the body in longitudinal direction. Said outer case 8 consists of a roof portion 8a covering the opening 1d of the body and an annular portion 8b fitting around the front portion 1a of the body 1. The roof portion 8a protrudes forward in its front portion 8a1 over the lamp 2 to serve as a shade therefor and protrudes backward in its back portion 8a2 over the back portion 1b of the body 1 to serve as an eaves for the sound openings and the knobs 5b, 5c and 7a. A protuberance 8a3 is formed longitudinally on the top of the roof portion 8a to give the whole lamp radio case a favorable contour.

The operation will be explained. The body 1 is mounted on a handle of a bicycle or the like making use of the mounting member 1e provided on the bottom surface of the body 1. A dry cell is encased in the cell box 3 incorporated in the space 1c. Then the outer case 8 is mounted on the body 1 in such a way that the back portion 8a2 of the outer case 8 is slided over the front portion 1a of the body 1 toward the back. Thereby, the outer case is mounted on the body and, at the same time, the water-tight fitting of the outer case over the packing member provided along the circumference of the opening 1d of the body 1 is accomplished. Thus the outer case 8 is securely fixed to the body 1. In addition, a nut may be screwed into the bottom of the body from the annular portion 8b of the outer case 8 if desired according to occasion.

When driving at night, the switch knob 7a of the switch 7 is manipulated to turn the lamp 2 on or off. Radio broadcasing can be listened to by manipulating the volume knob 5b and the tuning knob 5c.

In the accompanying drawings showing one embodiment of the present invention, there is illustrated a bicycle lamp radio device which is provided with a lamp unit in the front portion 1a of the body which is smaller in diameter and a radio set in its back portion 1b, larger in diameter. It is, however, noted that the lamp unit and the radio set may be located in the reverse position, that is, a lamp unit in 1b and a radio set in 1a. In this case, it is a matter of course that the whole device should be mounted on a bicycle etc. with its larger portion 1b facing forward.

As apparent from the foregoing description, the bicycle lamp radio device according to the present invention has such an advantage that breakage or corrosion of the electric unit possibly caused by water-drops etc. can be completely eliminated by adoption of the outer case which is fitted to the body to water-tightly cover the opening formed therein to replace a dry cell. Said outer case can be easily attached to and detached from said body which is formed in tapered shape, thereby enabling a dry cell to be easily and rapidly replaced.

Furthermore, the bicycle lamp radio device according to this invention is simple in structure, and can be manufactured and sold in large quantities at reasonable cost.

What is claimed is:

1. Housing apparatus adapted to be mounted upon a bicycle for receiving therein and protecting from the ambient environment a lamp, a radio and a battery for energizing the lamp and the radio, said housing apparatus comprising:
   a. an inner body configured to present a first, outer tapered cylindrical surface, and having a battery receiving enclosure therein and an opening through said first, outer tapered cylindrical surface in communication with said battery receiving enclosure;
   b. sealing means disposed about the periphery of said opening;
   c. a removable outer case having a second, inner tapered surface conforming to said first, outer tapered surface, said removable outer case being slidably disposed about said inner body to cover said opening and to provide a water-tight seal between said outer case, and said sealing means and said first, outer tapered surface of said inner body; and
   d. means for attaching said housing apparatus to a portion of the bicycle.

2. Housing apparatus as claimed in claimed in claim 1 wherein said outer case has an axial dimension in excess of the axial dimension of said inner body to provide, when disposed about said inner body, a first overhanging portion extending beyond and protecting a first end of said inner body and a second overhanging portion extending beyond and protecting a second end of said inner body.

3. Apparatus as claimed in claim 2, wherein said first end of said inner body is of greater surface area than said second end thereof, said second end comprising a lens for directing therethrough radiation from the lamp.

* * * * *